United States Patent
Yang

(10) Patent No.: US 7,180,213 B2
(45) Date of Patent: Feb. 20, 2007

(54) VIBRATION MOTOR HAVING BRUSHES WITH DIFFERENT OSCULATORY TRACKS

(75) Inventor: Woo Seok Yang, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/870,466

(22) Filed: Jun. 18, 2004

(65) Prior Publication Data

US 2005/0212369 A1   Sep. 29, 2005

(30) Foreign Application Priority Data

Mar. 24, 2004   (KR) .................... 10-2004-0020119

(51) Int. Cl.
*H02K 7/06* (2006.01)

(52) U.S. Cl. ........................................ 310/81; 310/233

(58) Field of Classification Search ................ 310/71, 310/81, 233, 248–249
See application file for complete search history.

(56) References Cited

U.S. PATENT DOCUMENTS

| 5,793,133 | A  | * | 8/1998 | Shiraki et al. ............... 310/81 |
| 6,522,037 | B2 | * | 2/2003 | Lee et al. ................ 310/68 R |
| 6,734,594 | B2 | * | 5/2004 | Lee et al. .................. 310/220 |

FOREIGN PATENT DOCUMENTS

JP   55-133651   10/1980

* cited by examiner

*Primary Examiner*—Thanh Lam
(74) *Attorney, Agent, or Firm*—Lowe Hauptman & Berner, LLP.

(57) ABSTRACT

A vibration motor includes a stator assembly, a rotor assembly, a shaft and a pair of brushes having different osculatory tracks. The stator assembly includes a magnet and a lower substrate. The rotor assembly has an eccentric weight, and includes a commutator positioned on the lower surface thereof and a coil. The shaft is inserted into a rotary center of the rotor assembly for forming a rotary shaft of the rotor assembly.

20 Claims, 5 Drawing Sheets

VIBRATION MOTOR HAVING BRUSHES WITH DIFFERENT OSCULATORY TRACKS

CLAIM OF PRIORITY

This application claims the benefit of Korean Patent Application No. 2004-20119 filed on Mar. 24, 2004, in the Korean Intellectual Property Office, the disclosure of which is incorporated herein by reference.

BACKGROUND OF THE INVENTION

1. Field of the Invention

The present invention relates to a vibration motor having brushes with different osculatory tracks, and more particularly to a vibration motor having brushes with different osculatory tracks, which reduces the abrasion of a commutator and has an elongated life span.

2. Description of the Related Art

Generally, communication apparatuses essentially require an incoming-call notification function. The above incoming-call notification function may take the form of sound, such as a melody or bell, or vibration.

The vibration is mainly used to prevent the melody or bell from being transmitted to the outside through a speaker, thereby not annoying other persons. In order to generate the vibration, a small-sized vibration motor is driven to transmit its driving force to a case of an apparatus, thereby vibrating the apparatus.

Vibration motors, which are recently applied to portable phones, are divided into coin type vibration motors having a small thickness and bar type vibration motors having a long shape according to shapes of the motors.

Regardless of the type of vibration motor, the vibration motor uses electromagnetic induction, in which electromagnetic force perpendicular to a magnetic field is generated by flowing current in the magnetic field, to which a conductor is positioned perpendicular.

The coin type vibration motor generates vibration in a simple manner such as by rotating a counter weight positioned therein.

Particularly, the coin type vibration motor has a small thickness and minimizes the number of components of a portable phone, thereby being increasingly used now.

FIG. 1 is an exploded perspective view of a conventional coin type vibration motor. With reference to FIG. 1, the coin type vibration motor 100 will be described in detail, as follows.

The coin type vibration motor 100 comprises a stator assembly 110 serving as a fixed member, and a rotor assembly 120 serving as a rotary member.

The stator assembly 110 includes a bracket 111 having a circular flat plate shape, a lower substrate 112 attached to an upper surface of the bracket 111, and a magnet 113 having a disk shape attached to an upper surface of the lower substrate 112.

The upper surface of the bracket 111 is sealed by a case 150, and is connected to the case 150 by a central shaft 130.

The rotor assembly 120 is rotatably connected to the shaft 130, and includes a bearing 121, coil assemblies 122, a counter weight 123, a commutator 124, an upper substrate 125 and an insulator 126.

The upper substrate 125 is a circular printed circuit board, and supplies current having opposite polarities to the coil assemblies 122 through patterns formed on upper and lower surfaces of the upper substrate 125 when power from the commutator 124 attached to the lower surface of the upper substrate 125 is supplied thereto.

The commutator 124 is buried under the lower surface of the upper substrate 125 such that a plurality of segments of the commutator 124 form a circle centering on a rotary center and a contact surface of the commutator 124 is exposed to the outside.

Each of the coil assemblies 122 includes at least one coil so that the coils have the same rotating radius as the magnet 113, and the powers having opposite polarities are supplied to the coil assemblies 122 by the upper substrate 125.

The counter weight 123 is made of a material having a high specific gravity, such as tungsten, and is attached on the surface of the upper substrate 125, on which the coil assemblies 122 are positioned, thereby determining the eccentricity of the vibration motor 100.

The insulator 126 serves to firmly attach the bearing 121, the coil assemblies 12 and the counter weight 123 to the upper substrate 125, and to insulate the bearing 121, the coil assemblies 12 and the counter weight 123 from the upper substrate 125.

Here, lower ends of the stator assembly 110 and the rotor assembly 120 are fixed to the lower substrate 112, and upper ends of the stator assembly 110 and the rotor assembly 120 are electrically interconnected by a brush 140 contacting the commutator 124.

FIG. 2 is a cross-sectional view of a conventional bar type vibration motor. With reference to FIG. 2, the bar type vibration motor 200 will be described in detail, as follows.

The bar type vibration motor 200 comprises a stator assembly 210 and a rotor assembly 220.

The stator assembly 210 includes a body 211, a cap 212 fixed to one side of the body 211, and a magnet 213. The body 211 has a hollow cylindrical shape, and the magnet 213 is fixed to the inside of the body 211.

The rotor assembly 220 includes an eccentric poise 223, a plurality of commutators 224 divisionally fixed to one surface of a fixing body 225, and a plurality of coil assemblies 222 fixed to the fixing body 225.

The commutators 224 include a plurality of flat segments on the lower surface of the fixing body 225, and the coil assemblies 222 are electrically connected to the commutators 224 respectively.

Here, one end of a shaft 230 is connected to the eccentric poise 223, and the other end of the shaft 230 is connected to the fixing body 225. The shaft 230 is rotatably supported by bearings 221 installed in the body 211.

Further, a lower substrate (not shown), provided with a pair of brushes 240 fixed thereto, is mounted on the fixing cap 212. The brushes 240 are connected to a lead wire 215 for supplying power therethrough, and contact the commutators 224, thereby applying current.

The above-described vibration motors, in which the brushes contact the commutators to supply current, are referred to as "brush type vibration motors". In order to achieve the commutating action of such brush type vibration motors, it is important to maintain proper stress of the brushes and to make the brushes contact the commutators constantly.

Hereinafter, types of the brushes of the coin-type vibration motor will be described.

With reference to FIG. 1, one end of the brush 140 is fixed to the lower substrate 112 by welding, and the uppermost tip of the other end of the brush 140 contacts the commutator 124 so as to apply current. The brush 140 serves to electrically connect the stator assembly 110 and the rotor assembly 120.

The brushes 140 are prepared in a pair, which are symmetrically designed for transmitting positive and negative power, and are located on the same osculatory track.

The brushes 140 are mainly made of a copper alloy, and the uppermost tips of the brushes 140 contacting the commutators 124 are coated with gold or other precious metal so as to obtain electric conductivity.

Regardless of which of the above-described types of vibration motors or types of brushes are used, left and right brushes 141 and 142 of the brush unit 140, as shown in FIG. 3, which are symmetrically positioned on the same osculatory track (R), contact the commutators along the same osculatory track (R).

That is, since contact portions of the commutators 124 contact the left and right brushes 141 and 142, the contact portions of the commutators are abraded twice per cycle (hereinafter, a track of the brush contacting the rotating surface of the commutator is referred to as an "osculatory track").

Accordingly, the contact portions of the commutators are worn out, thus shortening the life span of the vibration motor.

Accordingly, in order to solve the above problems, a vibration motor having brushes with different osculatory tracks has been required in the art.

SUMMARY OF THE INVENTION

Therefore, the present invention has been made in view of the above problems, and it is an object of the present invention to provide a vibration motor, which comprises a pair of brushes having different osculatory tracks toward a contact portion of commutator so that the abrasion of the commutator is reduced, thereby having an improved performance and an elongated life span.

In accordance with one aspect of the present invention, the above and other objects can be accomplished by the provision of a vibration motor comprising: a stator assembly including a magnet and a lower substrate; a rotor assembly having an eccentric weight, and including a commutator positioned on the lower surface thereof and a coil assembly for generating electromagnetic force by current applied from the commutator; a shaft inserted into a rotary center of the rotor assembly for forming a rotary shaft of the rotor assembly; and a pair of brushes, having osculatory tracks on the commutator, provided with ends fixed to a lower surface of the stator assembly and the other ends selectively contacting a portion of the commutator to apply current.

Preferably, the other ends of the brushes may be divided into two parts, which are spaced by a designated interval, and the osculatory tracks of the divided tips of the brushes may alternate with each other.

Alternately, preferably, the other ends of the brushes may be divided into two parts, which are spaced by a designated interval, and the osculatory tracks of the divided tips of the brushes partially may alternate with each other so that portions of the osculatory tracks overlap with each other.

In accordance with another aspect of the present invention, there is provided a coin type vibration motor comprising: a stator assembly including a lower substrate provided with a magnet having a ring shape; a case for sealing an upper part of the stator assembly and defining an inner space; a rotor assembly having an eccentric weight, and including a commutator positioned on the lower surface thereof and a coil assembly for generating electromagnetic force by current applied from the commutator; a shaft provided with one end fixed to a center of the stator assembly and the other end inserted into a rotary center of the rotor assembly for forming a rotary shaft of the rotor assembly; and a pair of brushes, having osculatory tracks on the commutator, provided with ends fixed to a lower substrate of the stator assembly and the other ends selectively contacting a portion of the commutator to apply current.

Preferably, the rotor assembly may further include a counter weight.

Further, preferably, the rotor assembly may further include a bearing connected to the rotary center so that the bearing contacts the outer circumference of the shaft, and an insulator for insulating the rotor assembly from other components, and firmly connecting the coil assembly, the counter weight and the bearing to an upper substrate.

In accordance with yet another aspect of the present invention, there is provided a bar type vibration motor comprising: a stator assembly including a magnet attached to an inside of a body having a hollow cylindrical shape in a longitudinal direction, and a cap, fixed to one side of the body, to which a lower substrate is attached; a rotor assembly having an eccentric weight, and including a commutator positioned on the lower surface thereof and a coil assembly arranged in the longitudinal direction of the body for generating electromagnetic force by current applied from the commutator; a shaft inserted into a rotary center of the rotor assembly for forming a rotary shaft of the rotor assembly; a plurality of bearings connected to the rotary center so that the bearings contact the outer circumference of the shaft; and a pair of brushes, having osculatory tracks on the commutator, provided with ends fixed to a lower substrate of the stator assembly and the other ends selectively contacting a portion of the commutator to apply current.

Preferably, the rotor assembly may further include an eccentric poise fixed to one end of the shaft.

One ends of a pair of the brushes may be fixed to the lower substrate of the stator assembly, and the uppermost portions of the other ends of a pair of the brushes may selectively contact a portion of the commutator to apply current and are extended downwardly in a curved line.

Alternately, one ends of a pair of the brushes may be fixed to the lower substrate of the stator assembly, the brushes may be extended from the ends in one direction by a designated length and bent in a U-shape in the opposite direction, and the uppermost portions of the other ends of a pair of the brushes may selectively contact a portion of the commutator to apply current.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 6:
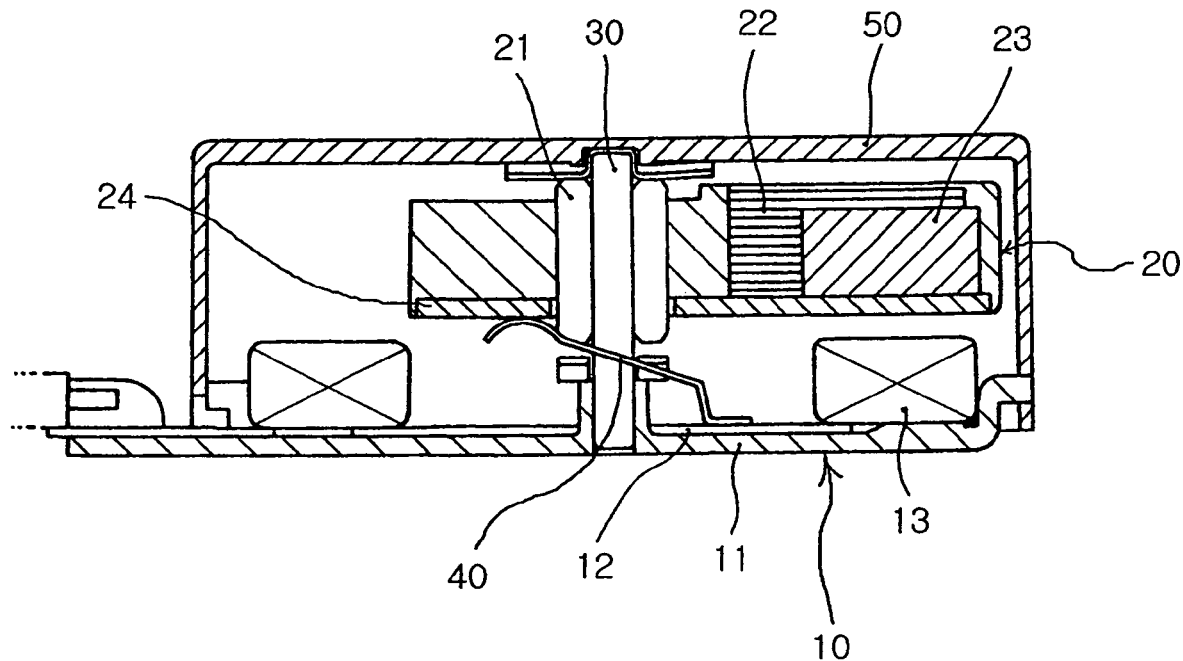
FIG. 6 is a cross-sectional view of a coin type vibration motor having brushes with different osculatory tracks in accordance with one embodiment of the present invention.
Figure 3:
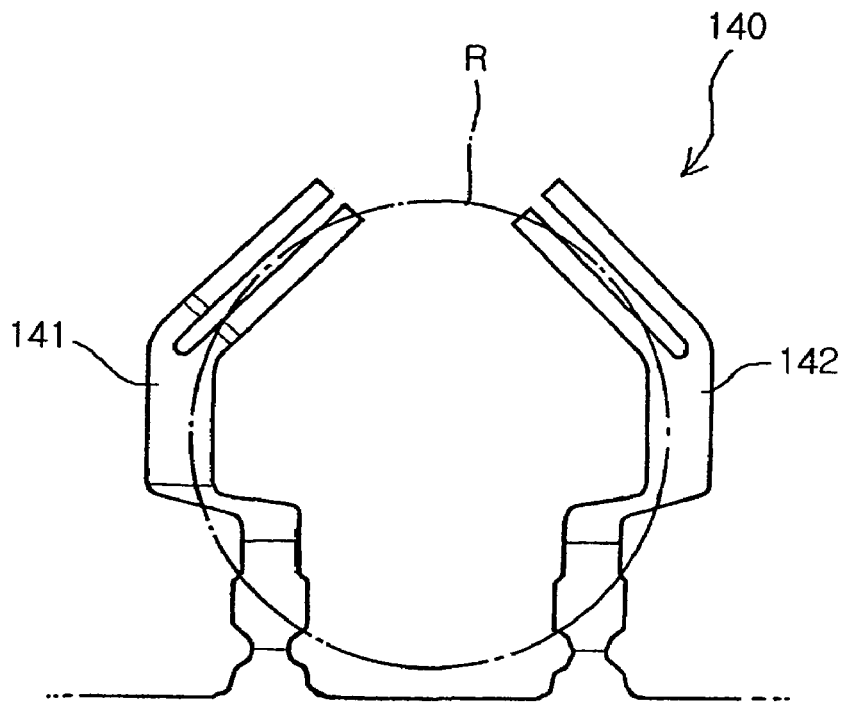
FIG. 3 is a plane view of a conventional brush unit having brushes with the same osculatory track.
Figure 4:
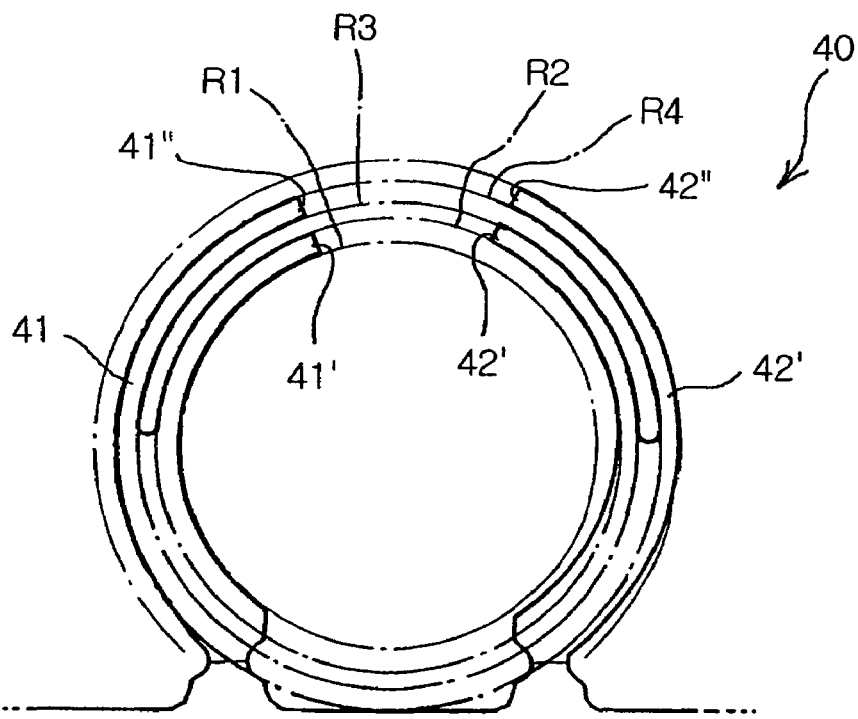
FIG. 4 is a plan view of a first embodiment of a brush unit having brushes with different osculatory tracks in accordance with the present invention.
Figure 5:
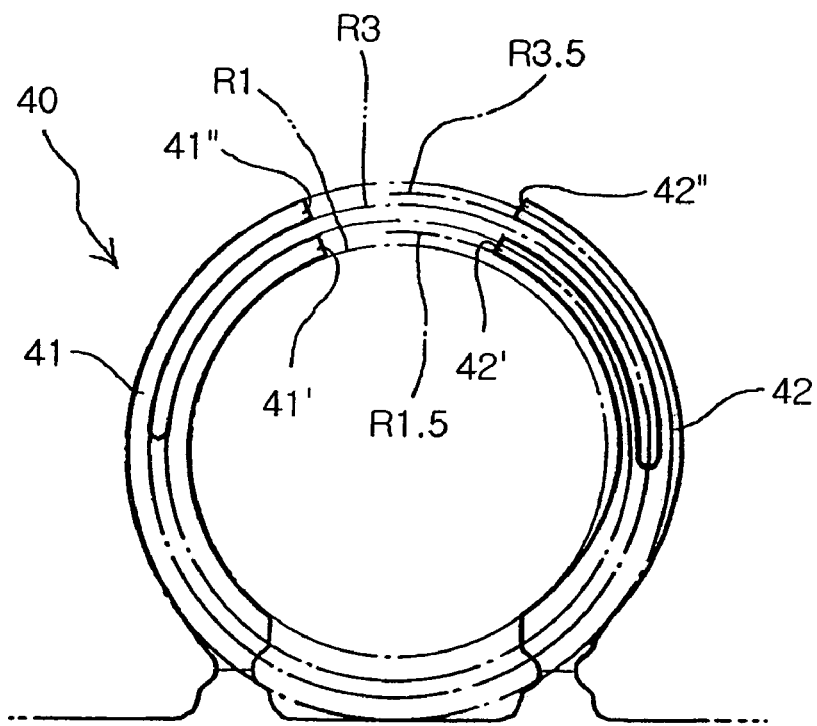
FIG. 5 is a plan view of a second embodiment of the brush unit having the brushes with different osculatory tracks in accordance with the present invention.

FIGS. 4 and 5 are plan views of embodiments of a brush unit having brushes with different osculatory tracks in accordance with the present invention, and FIG. 6 is a cross-sectional view of a vibration motor having the brushes with different osculatory tracks in accordance with one embodiment of the present invention. The vibration motor of the present invention is applied regardless of types of the brushes. Hereinafter, a coin type vibration motor will be exemplarily described in detail.

As shown in FIGS. 4 to 6, one ends of the brushes 41 and 42 of the brush unit 40 are fixed to a lower substrate 12 of a stator assembly 10, and the other ends of the brushes 41 and 42 selectively contact a commutator 24, thereby applying current thereto.

Conventional brushes, which have the same osculatory track, cause high abrasion of a contact portion of the commutator.

In order to solve the above problem, the present invention provides the brush unit 40 having a pair of the brushes 41 and 42, which have different osculatory tracks (R) on the commutator.

That is, ends of the left and right brushes 41 and 42 are positioned on different osculatory tracks (R), thereby reducing the abrasion of the commutator 24.

In accordance with the first embodiment as shown in FIG. 4, it is preferable that one end of each of the left and right brushes 41 and 42 of the brush unit 40 is divided into two parts, which are spaced from each other by a designated interval, and the divided tips of each of the left and right brushes 41 and 42 have different osculatory tracks alternating with each other.

That is, a first tip 41' of the left brush 41 is placed on an osculatory track R1 having a radius "1", and a first tip 42' of the right brush 42 is placed on an osculatory track R2 having a radius "2".

In the same manner, a second tip 41" of the left brush 42 is placed on an osculatory track R3 having a radius "3", and a second tip 42" of the right brush 42 is placed on an osculatory track R4 having a radius "4".

The divided tips 41', 41", 42' and 42" of the left and right brushes 41 and 42 have different osculatory tracks R1, R2, R3 and R4, thus reducing the abrasion of a contact portion of the commutator installed on the lower surface of a rotor assembly when the rotor assembly is rotated.

In accordance with the second embodiment as shown in FIG. 5, it is preferable that one end of each of the left and right brushes 41 and 42 of the brush unit 40 is divided into two parts, which are spaced from each other by a designated interval, and the divided tips of each of the left and right brushes 41 and 42 have different osculatory tracks partially alternating with each other so that the osculatory tracks are partially overlapped with each other.

That is, the first tip 41' of the left brush 41 is placed on an osculatory track R1 having a radius "1", and the first tip 42' of the right brush 42 is placed on an osculatory track R1.5 having a radius "1.5". Here, the osculatory track R1.5 having the radius "1.5" refers to an osculatory track, which is located on the middle between the osculatory track R1 having the radius "1" and the osculatory track R2 having the radius "2". That is, a half portion of the osculatory track R1 of the first tip 41' of the left brush 41 and a half portion of the osculatory track R1.5 of the first tip 42' of the right brush 42 overlap with each other.

In the same manner, the second tip 41" of the left brush 41 is placed on an osculatory track R3 having a radius "3", and the second tip 42" of the right brush 42 is placed on an osculatory track R3.5 having a radius "3.5".

Here, the osculatory track R3.5 having the radius "3.5" refers to an osculatory track, which is located on the middle between the osculatory track R3 having the radius "3" and the osculatory track R4 having the radius "4". That is, a half portion of the osculatory track R3 of the second tip 41" of the left brush 41 and a half portion of the osculatory track R3.5 of the second tip 42" of the right brush 42 overlap with each other.

The above arrangement of the brush unit 40, in which the osculatory tracks of the tips of the left and right brushes 41 and 42 partially overlap with each other, is usefully applied to the increase or decrease of the sizes of the commutator 24 and the brushes 41 and 42.

Accordingly, the half portions of the osculatory tracks R1, R1.5, R3, and R3.5 of the divided tips 41', 41", 42' and 42" of the left and right brushes 41 and 42 partially overlap with each other, thus partially reducing the abrasion of the commutator 24.

The above-described arrangements of the brushes are applied regardless of the types of the vibration motor. That is, such arrangements are applied to both the coin type vibration motor and the bar type vibration motor.

As described above with reference to FIG. 6, the coin type vibration motor comprises a stator assembly 10, a rotor assembly 20, a shaft 30, of which one end is fixed to the stator assembly 10, serving as a rotary shaft of the rotor assembly 20, and a case 50 defining an inner space.

The stator assembly 10 includes a lower substrate 12 provided with a magnet 13 having a ring shape attached thereto.

The case 50, defining the inner space, seals the upper part of the stator assembly 10, and the rotor assembly 20 has an eccentric weight and includes the commutator 24 placed on the lower surface thereof and a coil assembly 22 for generating electromagnetic force by current applied from the commutator 24.

One end of the shaft 30 is fixed to the central part of the stator assembly 10, and the other end of the shaft 30 is inserted into a rotary center of the rotor assembly 20, thereby serving as a rotary shaft of the rotor assembly 20.

The rotor assembly 20 further includes a counter weight 23, a bearing 21 connected to the rotary center so as to contact the outer circumference of the shaft 30, and an insulator 26.

As shown in FIG. 4, the coin type vibration motor of the present invention comprises the brush unit 40 having a pair of the brushes 41 and 42 with different osculatory tracks contacting the commutator 24, thereby having an effect of reducing the abrasion of the commutator 24.

In accordance with the first embodiment, it is preferable that ends of the brushes 41 and 42 are divided into two parts, which are spaced by a designated interval, and the osculatory tracks of the divided tips of the brushes 41 and 42 alternate with each other (i.e., the oscultatory tracks do not overlap each other) (with reference to FIG. 4).

In accordance with the second embodiment, it is preferable that ends of the brushes 41 and 42 are divided into two parts, which are spaced by a designated interval, and the oscultatory tracks of the divided tips of the brushes 41 and 42 partially alternate with each other (i.e., portions of the oscultatory tracks do not overlap with each other, and the other portions of the oscultatory tracks overlap with each other) (with reference to FIG. 5).

Figure 1:
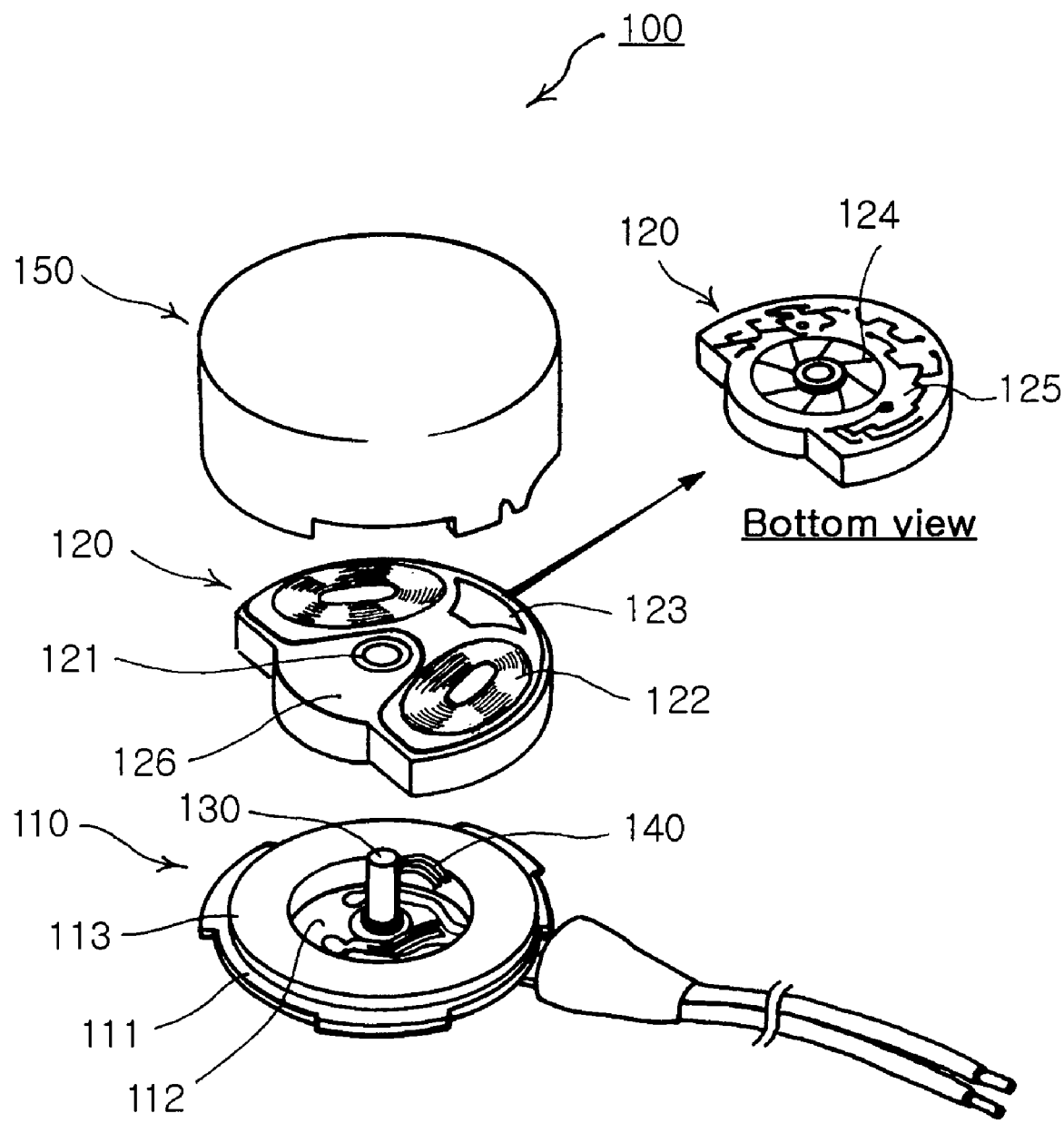
FIG. 1 is an exploded perspective view of a conventional coin type vibration motor.
Figure 2:
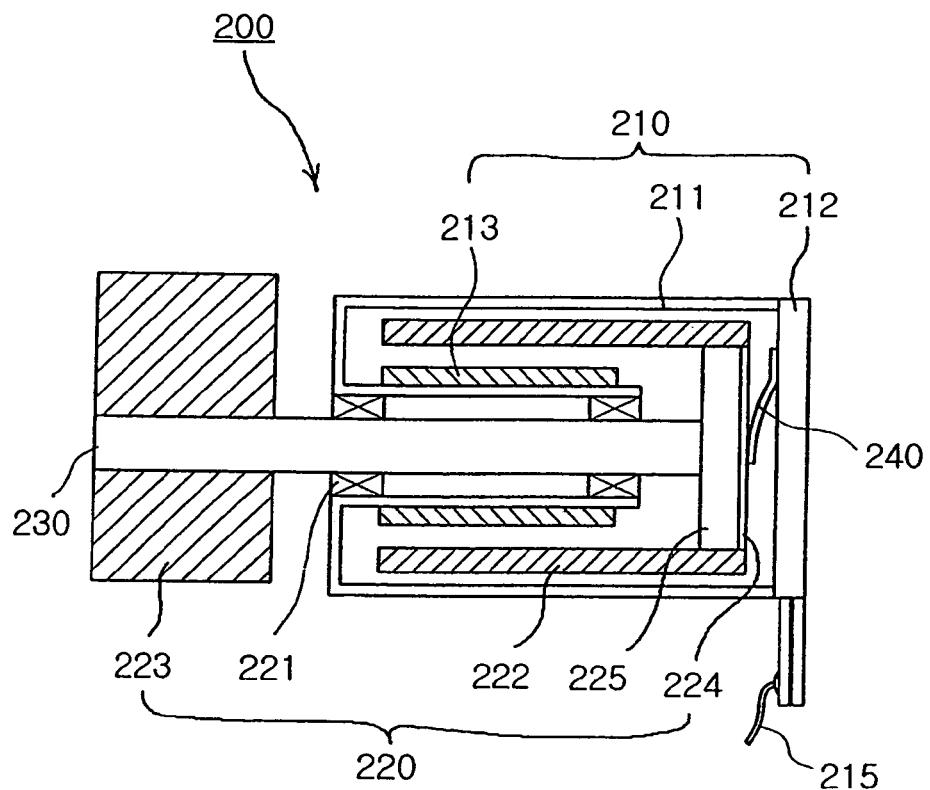
FIG. 2 is a cross-sectional view of a conventional bar type vibration motor.

Further, as described above with reference to FIG. 2, the bar type vibration motor comprises the stator assembly 210, the rotor assembly 220, and the shaft 230 serving as a rotary shaft of the rotor assembly 220.

The stator assembly 210 includes the magnet 213 attached to the inner surface of the hollow cylindrical body 211 in a longitudinal direction, and the cap 212, fixed to one side of the body 211, to which the lower substrate is attached.

The rotor assembly 220 has an eccentric weight, and includes the commutators 224 divisionally fixed to one surface of the fixing body 225 and the coil assemblies 222 for generating electromagnetic force by current applied from the commutators 224.

The eccentric poise 223 is fixed to one end of the shaft 230, and the other end of the shaft 230 is inserted into the rotary center of the rotor assembly 220. Thereby, the shaft 230 serves as the rotary shaft of the rotor assembly 220.

A plurality of the bearings 221 are connected to the rotary center so that the bearings 221 contact the outer circumference of the shaft 230.

As shown in FIG. 4, the bar type vibration motor of the present invention comprises the brush unit 40 having a pair of the brushes 41 and 42 with different oscultatory tracks contacting the commutator 24, thereby having an effect of reducing the abrasion of the commutator 24.

In accordance with the first embodiment, it is preferable that ends of the brushes 41 and 42 are divided into two parts, which are spaced by a designated interval, and the oscultatory tracks of the divided tips of the brushes 41 and 42 alternate with each other (i.e., the oscultatory tracks do not overlap each other) (with reference to FIG. 4).

In accordance with the second embodiment, it is preferable that ends of the brushes 41 and 42 are divided into two parts, which are spaced by a designated interval, and the oscultatory tracks of the divided tips of the brushes 41 and 42 partially alternate with each other (i.e., portions of the oscultatory tracks do not overlap with each other, and the other portions of the oscultatory tracks overlap with each other) (with reference to FIG. 5).

Figure 7:
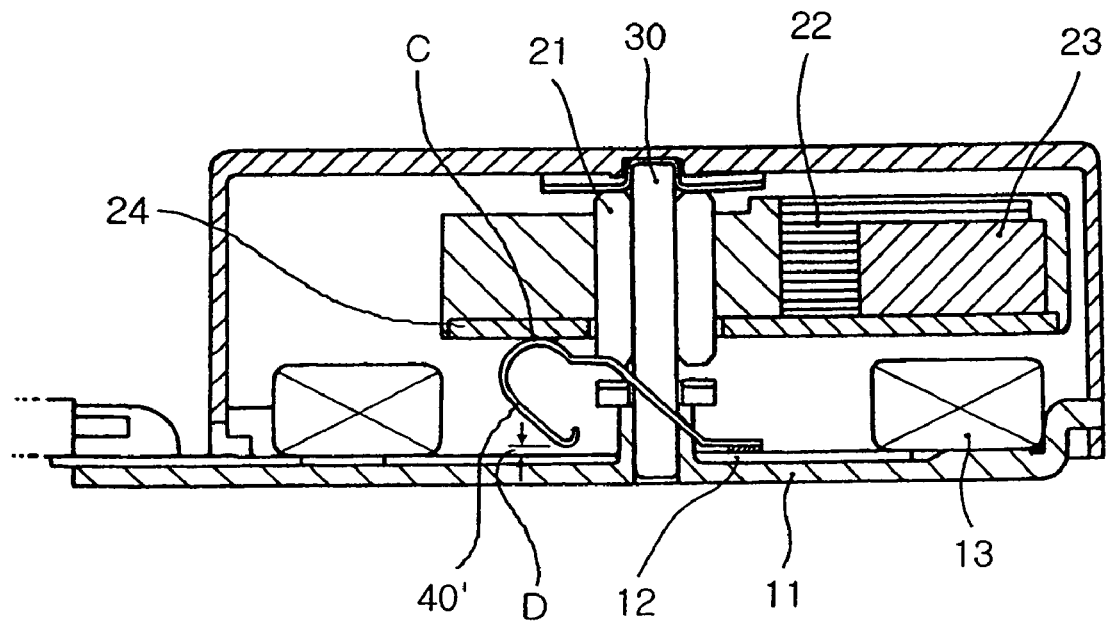
FIG. 7 is a cross-sectional view of a coin type vibration motor having brushes with different osculatory tracks in accordance with another embodiment of the present invention.
Figure 8:
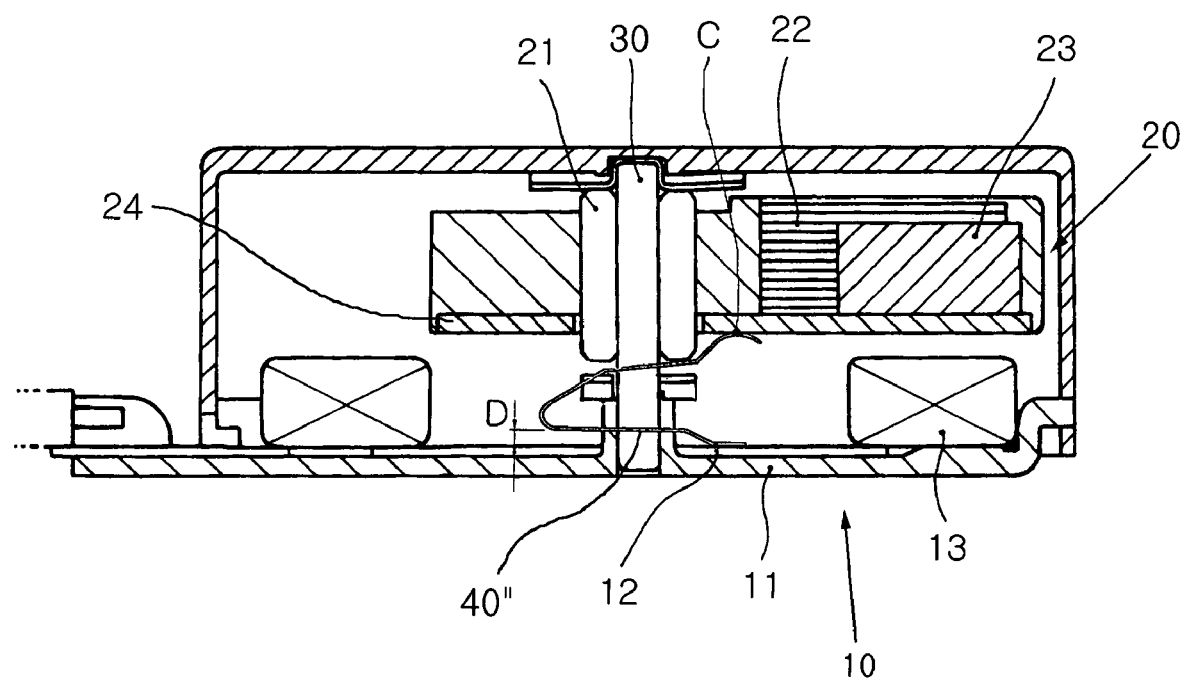
FIG. 8 is a cross-sectional view of a coin type vibration motor having brushes with different osculatory tracks in accordance with yet another embodiment of the present invention.

The above-described brush unit having the brushes with different oscultatory tracks in accordance with the present invention may have other types. FIGS. 7 and 8 illustrates vibration motors having brushes with improved shapes, and the brushes will be described, as follows.

As shown in FIG. 7, the uppermost portions (C) of brushes of a brush unit 40', i.e., portions contacting the commutator 24, are extended downwardly in a curved line.

The extension of the tips of the brushes of the brush unit 40' allows the brush unit 40' to withstand external impact.

For example, it is preferable that the uppermost portions (C) of brushes of a brush unit 40' are extended downwardly and bent in a curved line so that the extended tips are directed toward the fixed ends of the brushes. Further, it is preferable that the extended tips of the brushes of the brush unit 40' are spaced from the lower substrate 12 of the stator assembly 10 by a designated distance (D) so as to absorb external impact.

In this case, the brushes of the brush unit 40' also have different oscultatory tracks contacting the commutator 24.

As shown in FIG. 8, ends of brushes of a brush unit 40" are fixed to the lower substrate 12 of the stator assembly 10. Then, the brushes of the brush unit 40" are extended from the above ends by a designated length and bent in a U-shape, and the uppermost portions (C) of the other ends of the brushes of the brush unit 40" selectively contact the commutator 24.

Preferably, the brushes of the brush unit 40" are horizontally extended from the fixed ends by a designated length and bent in a U-shape so that the bending portions and the horizontally extending portions meet at a designated angle.

Further, preferably, the above U-shaped bending portions of the brushes of the brush unit 40" are spaced from the lower substrate 12 of the rotor assembly 10 by a designated distance (D) so as to absorb external impact.

The U-shaped bending portions of the brushes of the brush unit 40" properly increase the lengths of the brushes increase elastic deformation, and optimizes elastic stress, thereby preventing the sagging of the brushes and minimizing electrical and mechanical abrasion of the brushes.

In this case, the brushes of the brush unit 40" also have different oscultatory tracks contacting the commutator 24.

Preferably, ends of the brushes of the brush unit 40" are divided into two parts, which are spaced by a designated interval, and the oscultatory tracks of the divided tips of the brushes alternate with each other.

Alternately, preferably, ends of the brushes of the brush unit 40" are divided into two parts, which are spaced by a designated interval, and the oscultatory tracks of the divided tips of the brushes partially alternate with each other so that portions of the oscultatory tracks overlap with each other.

The brushes having different oscultatory tracks in accordance with the present invention are applied to the improved shapes of the brushes of the brush unit, thereby reducing the abrasion of the commutator and improving the performance of the vibration motor.

As apparent from the above description, the present invention provides a vibration motor having brushes with different oscultatory tracks, which is applicable regardless of shapes of the vibration motor and the brushes.

Further, the vibration motor having brushes with different oscultatory tracks reduces the abrasion of a commutator.

Moreover, the vibration motor having brushes with different oscultatory tracks reduces the abrasion of the commutator, thereby having an improved performance and an elongated life span.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A vibration motor, comprising:
   a stator assembly including a magnet and a substrate;
   a rotor assembly having an eccentric weight, a commutator, and a coil assembly electrically connected to the commutator;
   a shaft inserted through the rotor assembly and defining a rotational axis of the rotor assembly; and first and second brushes each having a fixed portion fixed to the substrate of the stator assembly and a contacting portion contacting the commutator to apply electric current to said commutator;

wherein the contacting portions of the first and second bushes in a non-operational state of said motor are located at first and second distances, respectively, from a central point where the rotational axis of the rotor assembly meets the commutator, the first and second distances being different from each other, whereby, as said rotor assembly rotates without vibration, the contacting portions of the first and second brushes follow and contact the commutator along different tracks on said commutator.

2. The vibration motor as set forth in claim 1, wherein the contacting portion of each of the brushes is divided into two parts, which are spaced by a designated spacing, and tracks followed by the parts of the first brush on the commutator alternate with those followed by the parts of the second brush on the commutator.

3. The vibration motor as set forth in claim 2, wherein the tracks followed by the parts of the first brush on the commutator partially overlap with those followed by the parts of the second brush on the commutator.

4. The vibration motor as set forth in claim 1, being a coin type vibration motor, wherein
said substrate is at a lower part of said stator assembly and supports said magnet which has a ring shape;
said motor further comprises a case which is an upper part of the stator assembly and defines, together with said substrate, a space receiving said rotor assembly and brushes therein; and
said commutator is positioned on a lower surface of said rotor assembly.

5. The coin type vibration motor as set forth in claim 4, wherein the rotor assembly further includes a counter weight.

6. The coin type vibration motor as set forth in claim 4, wherein the rotor assembly further includes a bearing that contacts the outer circumference of the shaft.

7. The coin type vibration motor as set forth in claim 4, wherein the rotor assembly further includes an insulator for insulating the rotor assembly from other components and firmly connecting the coil assembly, the counter weight and the bearing to an upper substrate.

8. The vibration motor as set forth in claim 1, being a bar type vibration motor, wherein
the stator assembly comprises a hollow cylindrical body, to which said magnet is attached and which said coil assembly is located, and a cap, which is fixed to one end of the body, and to which said substrate is attached; and
said motor further comprises a plurality of bearings that contact the outer circumference of the shaft.

9. The bar type vibration motor as set forth in claim 8, wherein the eccentric weight is an eccentric poise fixed to one end of the shaft.

10. The vibration motor as set forth in claim 1, wherein said commutator is positioned above said substrate;
each of said brushes comprises
a first section extending upwardly from the fixed portion to the contacting portion, which defines the uppermost point of said brush, and
a second section extending downwardly from the contacting portion toward the substrate and terminating at a terminal which is spaced above said substrate and closer to said substrate than to said commutator.

11. The vibration motor as set forth in claim 1, wherein said commutator is positioned above said substrate;
each of said brushes comprises a U-shaped section connecting the fixed portion and the contacting portion which defines the uppermost point of said brush.

12. The vibration motor as set forth in claim 2, wherein all tracks followed by the parts of both said brushes on the commutator are non-overlapping.

13. A vibration motor, comprising:
a stator assembly including a magnet and a substrate;
a rotor assembly having an eccentric weight, a commutator, and a coil assembly electrically connected to the commutator;
a shaft inserted though the rotor assembly and defining a rotational axis of the rotor assembly; and
first and second brushes each having a fixed portion fixed to the substrate of the stator assembly and at least one contacting portion contacting the commutator to apply electric current to said commutator;
wherein
said first brush has first and second contacting portions being located at first and second radiuses, respectively, from the rotational axis of the rotor assembly;
said second brush has a third contacting portion being located at a third radius from the rotational axis of the rotor assembly; and
said first radius is smaller than said third radius which is, in turn, smaller than the second radius.

14. The vibration motor as set forth in claim 13, wherein said second brush further has a fourth contacting portion being located at a fourth radius from the rotational axis of the rotor assembly, and said fourth radius is greater than the second radius.

15. The vibration motor as set forth in claim 13, wherein, as said rotor assembly rotates, all contacting portions of both said brushes follow and contact the commutator along different, non-overlapping, concentric, circular tracks on said commutator.

16. The vibration motor as set forth in claim 13, wherein, as said rotor assembly rotates, all contacting portions of both brushes follow and contact the commutator along different concentric, circular tracks on said commutator, and said tracks overlap only partially rather than completely.

17. The vibration motor as set forth in claim 14, wherein, as said rotor assembly rotates, all four contacting portions of both said brushes follow and contact the commutator along four different, non-overlapping, concentric, circular tracks on said commutator.

18. The vibration motor as set forth in claim 15, wherein an entirety of each said track is contactable directly physically with only one of said brushes.

19. The vibration motor as set forth in claim 17, wherein an entirety of each said track is contactable directly physically with only one of the contacting portions of only one of said brushes.

20. The vibration motor as set forth in claim 1, wherein the contacting portion of the first brush is curved along an arc that is a part of a first imaginary circle, and the contacting portion of the second brush is curved along an arc that is a part of a second imaginary circle, the first imaginary circle having a radius different from that of the second imaginary circle.

* * * * *